March 23, 1965 L. C. PARKER 3,174,511
FLUID PRESSURE VALVE ASSEMBLY CONTROL WITH
INDEPENDENT ACTIVATING AND RESET MEANS
Filed June 14, 1962
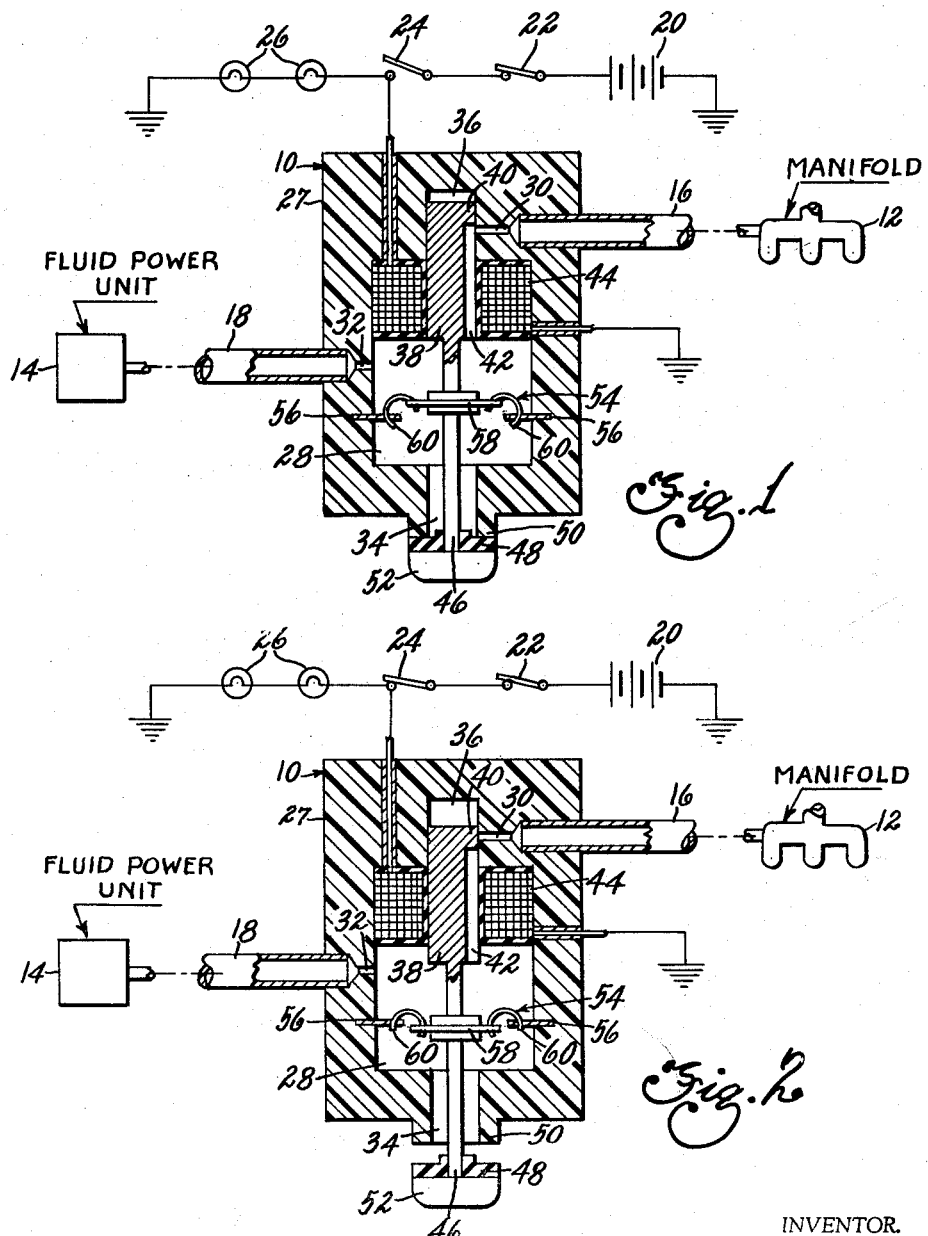
INVENTOR.
LELAND C. PARKER
BY
D.D. McGraw
HIS ATTORNEY

United States Patent Office 3,174,511
Patented Mar. 23, 1965

3,174,511
FLUID PRESSURE VALVE ASSEMBLY CONTROL WITH INDEPENDENT ACTIVATING AND RESET MEANS
Leland C. Parker, Rochester, N.Y., assignor to General Motors Corporation, Detroit, Mich., a corporation of Delaware
Filed June 14, 1962, Ser. No. 202,618
3 Claims. (Cl. 137—625.65)

The invention relates to a valve assembly and more particularly to a valve assembly which provides positive control of a fluid circuit and acts to maintain the fluid circuit in a deenergized condition until the valve assembly is reset by independent control action. The valve assembly is disclosed as being utilized in a fluid system wherein a source of fluid pressure is connected to a fluid power unit, desirability of the operation of which is dependent upon the operating condition of an independent system.

In the preferred embodiment herein disclosed the fluid system may be part of a motor vehicle in which the intake manifold vacuum of the vehicle engine provides a fluid pressure source and a system such as the brake light control system is utilized to sense the desirability of rendering the fluid system inoperative. A typical installation of this type is that of a vehicle road speed control system. In such systems it is desirable to render the speed control functions inoperative when the vehicle brakes are applied and to keep the system inoperative until the vehicle operator takes a positive independent action other than release of the brakes to again render the control system operative. A road speed control system of the general type in which structure embodying the invention may be utilized is disclosed in application Serial No. 115,539, entitled "Speed Control System" and filed June 7, 1961. Reference is therefore made to that application for a typical system of this type wherein the valve assembly embodying the invention may be utilized in place of the brake actuated spoiler valve disclosed therein.

It is advantageous to provide a valve assembly of the type to which the invention appertains which may be utilized in any position in a vehicle and may be located in positions other than immediately adjacent the brake pedal arm, for example. Such a valve assembly should be simple and positive in operation, inexpensive to produce and maintain, easy to install and remove, and operable in any orientation or placement within the vehicle. Once the valve assembly deenergizes the fluid pressure control system it should maintain this deenergized condition until it is positively reactivated by the vehicle operator by some action requiring the operator to intend to so reactivate it. Once reactivated it should remain in this position without regard to fluctuations in fluid pressure until the vehicle operator performs a predetermined function having as its objective a resultant mode of operation which is incompatible with continued operation of the fluid pressure control system. This is the condition in effect when the vehicle operator applies the vehicle brakes while the vehicle speed is being controlled by a speed control system. A valve assembly embodying the invention accomplishes these results effectively.

In the drawing:
FIGURE 1 is a schematic illustration of a valve assembly embodying the invention, with parts broken away and in section, and including a schematic illustration of a typical fluid pressure system and an independent system for controlling the valve assembly during one part of its operation.

FIGURE 2 is similar to FIGURE 1 and illustrates the valve assembly after it has deenergized the fluid pressure system in response to a condition of the independent system.

The fluid pressure system in which the valve assembly 10 is illustrated as being utilized includes a fluid pressure source such as the engine intake manifold 12, the fluid power unit 14, conduit 16 interconnecting manifold 12 and valve assembly 10, and conduit 18 interconnecting the valve assembly 10 and the fluid power unit 14. The independent system to which a portion of operation of the valve assembly 10 may be sensitive is illustrated as being the electrical circuit controlled by the vehicle brake switch for energizing the vehicle stop lights when the vehicle brakes are applied. As illustrated this circuit includes a source of electrical energy such as battery 20 having one terminal thereof connected to ground and the other terminal thereof connected to the ignition switch 22, which is in turn connected in series with the brake switch 24 and the stop lights 26. The brake switch 24 may be of any suitable type and is illustrated as one which is normally open and is actuated upon application of the vehicle brakes to be closed so as to energize the stop lights 26.

The valve assembly 10 is schematically illustrated as including the housing 27 in which a valve chamber 28 is provided. A fluid pressure inlet passage 30 is in communication with chamber 28 and is connected with the fluid pressure source 12 by conduit 16. A fluid pressure outlet passage 32 is connected with chamber 28 and in fluid communication with fluid power unit 14 by means of conduit 18. A vent 34 is also formed in housing 27 so as to be capable of venting chamber 28. When the fluid pressure system is utilizing air as the fluid medium, vent 34 may be open to the atmosphere.

A section 36 of chamber 28 is formed to provide a valve receiving chamber section in which the valve member 38 may move. Valve member 38 is illustrated as being reciprocably received in chamber section 36 and is provided with a land 40 at one thereof adjacent the fluid pressure inlet 30, which opens into chamber section 36. An axially extending groove 42 is provided in valve member 38 and terminates adjacent land 40 at one end and opens into the main part of chamber 28 at the other end. Groove 42 is in alignment with fluid pressure inlet 30 so that when the valve is in the position shown in FIGURE 1, inlet 30 is in fluid communication with the main portion of chamber 28 through groove 42. Valve member 38 also extends through and in reciprocable relation with a solenoid coil 44 which is received in a portion of chamber 28 and formed to have an opening therethrough in alignment with chamber section 36 to accommodate the valve member 38. Valve member 38 is made of a suitable magnetically attractive material so as to function as a solenoid armature or core. Solenoid coil 44 is so wound that when energized it exerts a magnetic force tending to move valve member 38 downwardly as seen in FIGURE 1 to the position shown in FIGURE 2 wherein land 40 closes off inlet 30 so that the fluid pressure source 12 is no longer in fluid communication with chamber 28. Solenoid coil 44 is electrically connected to the normally open contact of brake switch 24 and to ground so that it is energized when the stop lights 26 are energized. Energization of coil 44 therefore occurs each time the vehicle brakes are actuated.

Valve member 38 is provided with a stem 46 extending from the armature portion of the valve member through the main portion of chamber 28 and vent 34. A valve 48 is provided on the end of stem 46 so that it is seated against valve seat 50, formed as a part of vent 34, when groove 42 is in fluid communication with inlet 30. A suitable manually actuable element such as button 52 is provided to move valve 48 in engagement with its valve seat 50 in order to close the vent 34 and open inlet 30 into communication with groove 42 and chamber 28. A suitable extension may be provided so that button 52 may be located in other positions other than immediately adjacent the valve assembly 10 should conditions warrant.

An over-center spring assembly 54 is provided in chamber 28 and is disclosed as including mounting elements 56 secured to the inner wall of chamber 28 formed by housing 26, and a leaf type mounting spring 58 suitably secured to valve stem 46 so as to be axially movable therewith. Generally U-shaped springs 60 interconnect the mounting elements 56 and the leaf spring 58 to complete the over-center spring assembly. The spring assembly is shown in FIGURE 1 in one position wherein it urges valve member 38 upwardly and holds the valve member in that position so that inlet 30 is held in communication with groove 42. The over-center spring assembly 54 is shown in FIGURE 2 after it has passed its over-center position and is urging valve member 38 downwardly and holding it in the position wherein land 40 blocks fluid communication of inlet 30 with any part of chamber 28 or groove 42. In the latter position, valve 48 is unseated from its seat 50 and vent 34 is open. Chamber 28 is therefore vented to atmosphere, as is outlet 32. Since fluid power unit 14 is connected to outlet 32 through conduit 18, it follows that the fluid power unit is also vented to atmosphere. When the valve assembly is in the condition shown in FIGURE 1, the over-center spring assembly 54 maintains sufficient upward force on valve stem 46 to hold valve 48 against its seat 50, closing vent 34. Since in the speed fluid system illustrated the fluid pressure utilized is subatmospheric, having originated in the intake manifold 12, the differential pressure acting on valve 48 will also tend to hold the valve seated. If, however, a superatmospheric fluid pressure system is utilized, spring assembly 54 should be able to exert enough force to hold valve 48 seated against the superatmospheric pressure.

In normal operation of a vehicle road speed control system the valve assembly will be in the position shown in FIGURE 2 wherein the fluid pressure control system is inactive. When the operator desires to activate the fluid pressure control system, he presses button 52 until over-center spring assembly 54 snaps over center, closing vent 34 and connecting inlet 30 with chamber 28 through groove 42. The fluid power unit 14 is therefore in communication with the fluid pressure source and, subject to other conditions of operation not pertinent to the invention, is rendered operable. The fluid pressure control system should be deactivated when the vehicle brakes are applied since the vehicle speed will be decreased and the system would otherwise open the engine throttle valve in an attempt to provide additional power to bring the system back to the desired speed. Once the fluid pressure control system has been deactivated it should not be capable of reactivation immediately upon release of the vehicle brakes. For this reason the over-center spring assembly 54 holds the valve member 38 and the valve 48 in the position shown in FIGURE 2 after the brake switch 24 has opened. In order for the operator to again activate the speed control system, he must again press button 52 as above described.

A valve assembly has been disclosed which is sensitive to an operational condition in one system to deactivate a second, independent system. The valve assembly will hold the second system in a deactivated condition. A positive action must be taken independent of operation of the first system to reactivate the second system by repositioning the valves in the valve assembly.

I claim:

1. A fluid controlling valve assembly having a circuit condition sensitive control, said valve assembly comprising, a housing having a fluid chamber formed therein and an inlet and a first outlet and a second outlet for said chamber, valve means movable to one position to close said inlet and to open one of said outlets and movable to a second position to open said inlet and close said one outlet, valve control means sensitive to a circuit condition of operation in a circuit independent of the fluid being controlled by said valve assembly, said valve control means being operable to move said valve means only to said one position including means for holding it in said one position, and independent manually actuable means for moving said valve means to said second position after said valve control means is deenergized.

2. The valve assembly of claim 1, wherein said holding means comprises an over-center spring attached to said valve means and actuable to hold said valve means in either of said positions when said valve means is moved to either of said positions.

3. A fluid pressure system control valve assembly for manual energization by a vehicle operator and deenergization under control of a vehicle brake system having a switch closed when the vehicle brake system is actuated, said control valve assembly comprising, a fluid tight housing having a valve chamber formed therein and a fluid pressure inlet and a fluid pressure outlet and a fluid pressure vent connected with said chamber, a valve member having an armature portion movably received in said chamber for opening and closing said fluid pressure inlet and a vent control portion for respectively closing and opening said fluid pressure vent, an over-center spring holding said valve member in one position where said fluid pressure inlet is open and said fluid pressure vent is closed and in another position where said fluid pressure inlet is closed and said fluid pressure vent is open to vent said chamber and said fluid pressure outlet, a solenoid coil mounted in said chamber and around said valve member armature portion and adapted to be connected to the brake system switch and energized when said switch is closed to move said valve member from said one position to said another position, and manually actuable means for moving said valve member from said another position to said one position by the vehicle operator after said solenoid coil is deenergized.

References Cited by the Examiner

UNITED STATES PATENTS

| 738,026 | 9/03 | Gill | 137—625.26 |
| 1,603,005 | 10/26 | Flam | 251—75 |
| 1,674,914 | 6/28 | Murray | 251—30 |
| 2,521,891 | 9/50 | Beams | 251—75 |
| 2,886,063 | 5/59 | Ray | 137—625.27 |
| 2,998,024 | 8/61 | Marette | 137—625.27 |

M. CARY NELSON, *Primary Examiner.*

MILTON KAUFMAN, *Examiner.*